(12) United States Patent
Scozzola et al.

(10) Patent No.: US 11,500,097 B2
(45) Date of Patent: Nov. 15, 2022

(54) MOTION DETECTION DEVICE

(71) Applicants: STMicroelectronics SA, Montrouge (FR); STMicroelectronics (Grenoble 2) SAS, Grenoble (FR)

(72) Inventors: Giovanni Scozzola, Saint Egreve (FR); Olivier Pothier, Sceaux (FR)

(73) Assignees: STMicroelectronics SA, Montrouge (FR); STMicroelectronics (Grenoble 2) SAS, Grenoble (FR)

( * ) Notice: Subject to any disclaimer, the term of this patent is extended or adjusted under 35 U.S.C. 154(b) by 855 days.

(21) Appl. No.: 16/374,541

(22) Filed: Apr. 3, 2019

(65) Prior Publication Data

US 2019/0331798 A1 Oct. 31, 2019

(30) Foreign Application Priority Data

Apr. 26, 2018 (FR) ........................................ 1853656

(51) Int. Cl.
*G01S 17/00* (2020.01)
*G01S 17/58* (2006.01)
*G01S 17/10* (2020.01)
*G06F 3/01* (2006.01)

(52) U.S. Cl.
CPC .............. *G01S 17/58* (2013.01); *G01S 17/10* (2013.01); *G06F 3/011* (2013.01)

(58) Field of Classification Search
USPC ....................................................... 356/5.01
See application file for complete search history.

(56) References Cited

U.S. PATENT DOCUMENTS

| | | | | |
|---|---|---|---|---|
| 5,495,427 A * | 2/1996 | Puma | ........................ | G01S 5/30 367/125 |
| 8,134,888 B2 * | 3/2012 | Han | ........................ | G01S 11/16 367/128 |
| 8,213,263 B2 * | 7/2012 | Kim | ........................ | G01S 3/8083 367/125 |
| 8,213,264 B2 * | 7/2012 | Lee | ........................ | G01S 11/14 367/127 |
| 2005/0253807 A1 * | 11/2005 | Hohmann | ........... | G06F 3/04886 345/156 |
| 2010/0110834 A1 * | 5/2010 | Kim | ........................ | G01S 3/8083 367/124 |
| 2010/0128568 A1 * | 5/2010 | Han | ........................ | G01S 11/14 367/99 |
| 2010/0264830 A1 * | 10/2010 | Van Endert | ........ | F21V 23/0471 315/149 |
| 2010/0264833 A1 * | 10/2010 | Van Endert | .......... | H05B 47/125 315/294 |
| 2010/0277074 A1 * | 11/2010 | Van Endert | .......... | H05B 47/125 315/149 |
| 2010/0295481 A1 * | 11/2010 | Van Endert | ......... | F21V 23/0471 315/312 |
| 2010/0295773 A1 | 11/2010 | Mameh et al. | | |

(Continued)

*Primary Examiner* — James R Hulka
(74) *Attorney, Agent, or Firm* — Slater Matsil, LLP

(57) ABSTRACT

A method includes emitting, by a single sensor of a device, a signal into a region; receiving, by the single sensor, a reflected signal; and detecting motion in a detection cone comprising a central axis based on the reflected signal, wherein detecting motion comprises detecting a first type of motion from a first position to a second position, and detecting a second type of motion from the second position to the first position.

23 Claims, 3 Drawing Sheets

(56) References Cited

U.S. PATENT DOCUMENTS

| | | | |
|---|---|---|---|
| 2010/0309752 A1* | 12/2010 | Lee | G06F 3/0346 367/99 |
| 2012/0159330 A1* | 6/2012 | Jeong | G06F 3/017 715/863 |
| 2014/0267084 A1* | 9/2014 | Krulce | G06F 3/04883 345/173 |
| 2015/0116273 A1 | 4/2015 | Gao et al. | |
| 2015/0138086 A1* | 5/2015 | Underkoffler | G06F 3/0346 345/158 |
| 2015/0144767 A1 | 5/2015 | Drader et al. | |
| 2016/0011718 A1* | 1/2016 | Krulce | G06F 3/0416 345/173 |
| 2016/0132126 A1* | 5/2016 | van Laack | G06V 20/597 345/156 |
| 2016/0334875 A1* | 11/2016 | Kandadai | G02B 27/017 |
| 2017/0056926 A1* | 3/2017 | Rothberg | B81B 7/0077 |
| 2017/0212589 A1* | 7/2017 | Domenikos | G06F 3/016 |
| 2017/0344122 A1* | 11/2017 | Salvi | G06F 3/038 |
| 2018/0361585 A1* | 12/2018 | Williams | G05D 1/0282 |
| 2019/0302764 A1* | 10/2019 | Smith | B65G 69/2882 |

\* cited by examiner

MOTION DETECTION DEVICE

CROSS-REFERENCE TO RELATED APPLICATIONS

This application claims priority to French Patent Application No. 1853656, filed on Apr. 26, 2018, which application is hereby incorporated herein by reference.

TECHNICAL FIELD

The present disclosure concerns motion detection devices and more particularly devices configured to detect horizontal motion.

BACKGROUND

The detection of certain motions, for example, a horizontal motion from right to left or from left to right, is currently carried out with at least two sensors. The moving object can be detected by a first sensor and then by a second sensor. This enables the device to form a vector corresponding to the motion of the object. There is a need to improve the way in which horizontal motion is detected.

SUMMARY

An embodiment provides a device for detecting motions of a hand, including a single sensor of data representative of the average distance between the sensor and the hand.

According to an embodiment, the device is configured to detect substantially horizontal motions of the hand.

According to an embodiment, the sensor emits a signal capable of reflecting on the hand.

According to an embodiment, the device is capable of detecting a first type of motion, from a first position to a second position, and a second type of motion, from the second position to the first position.

According to an embodiment, the device is capable of detecting motions in a detection cone including a central axis.

According to an embodiment, the first type of motion includes motions where a first portion of the hand enters the detection cone before a second portion of the hand; and the second type of motion includes motions where the second portion of the hand enters the detection cone before the first portion, the first portion of the hand being the portion having a projection on the central axis of the detection cone most remote from the sensor and the second portion of the hand being the portion having a projection on the central axis of the detection cone closest to the sensor.

According to an embodiment, the device is configured to: detect the first type of motion when the maximum reflected signal is in the first half of the detection time period; and detect the second type of motion when the maximum reflected signal is in the second half of the detection time period.

According to an embodiment, the first type of motion corresponds to a motion from left to right for the left hand and from right to left for the right hand; and the second type of motion corresponds to a motion from right to left for the left hand and from left to right for the right hand.

According to an embodiment, the detection cone forms a solid angle in the range from approximately 1° to 80°.

According to an embodiment, the motion detection is independent from the rotation of the sensor around the central axis.

According to an embodiment, the device is capable of detecting the motion of an angled hand.

According to an embodiment, the device is capable of detecting the motion of a hand forming an angle greater than 5° with the horizontal axis.

According to an embodiment, the device is capable of detecting vertical motions.

According to an embodiment, the sensor is a time-of flight sensor.

According to an embodiment, the sensor is an ambient radiation sensor.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
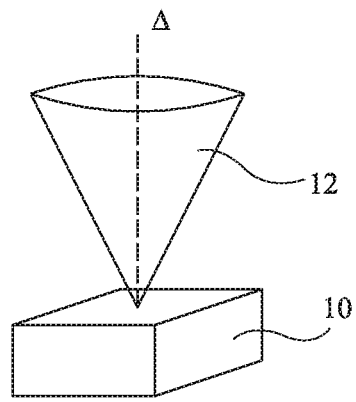
FIG. 1 is a very simplified representation of a sensor.

The same elements have been designated with the same reference numerals in the various drawings and, further, the various drawings are not to scale. For clarity, only those steps and elements which are useful to the understanding of the described embodiments have been shown and are detailed.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the concerned elements in the drawings. The terms "approximately", "about", "substantially", and "in the order of" are used herein to designate a tolerance of plus or minus 10%, preferably of plus or minus 5% of the value in question.

FIG. 1 is a simplified representation of a sensor 10. Sensor 10 is configured to detect motions in a detection cone 12. The detection cone 12 for example has a solid angle in the range from approximately 1° to approximately 80°, preferably 25°. As a variation, the cone of sensor 10 may be a straight ray, for example, a collimated laser. Detection cone 12 has a central axis Δ.

The sensor is configured to supply data representative of the average distance between sensor 10 and an object located in detection cone 12.

Sensor 10 is preferably a time-of-flight sensor. Sensor 10 sends a signal, for example, a light signal or ultrasound signal, in detection cone 12. If an object is present in the cone, the signal is reflected on the object. The reflected signal is received by sensor 10, which provides information representative of the distance between the sensor and the object. Sensor 10 is for example an ambient radiation sensor.

The data obtained by the sensor are average data over the entire cone. They thus do not depend on the horizontal orientation of sensor 10. More specifically, the rotation of the sensor along or about central axis Δ has no impact on the data obtained by the sensor and thus has no impact on the motion detection.

Figure 2:
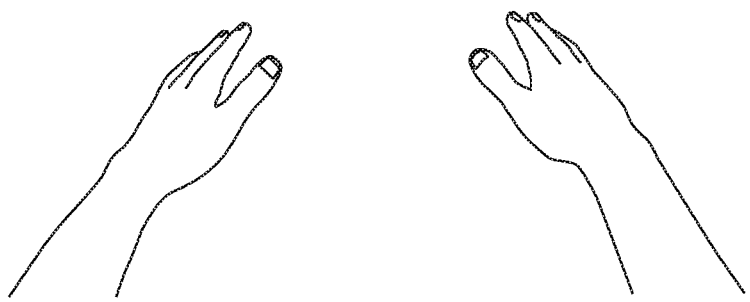
FIG. 2 shows an example of hand positions.

FIG. 2 illustrates an example of normal position of human hands. The inventor has observed that in normal position, hands located in front of a person are naturally angled. More specifically, the side of the hand where the thumb is located is naturally higher than the side of the hand where the little finger is located. Typically, during a substantially horizontal hand motion, the hand forms an angle of at least 5° with the horizontal direction.

During a substantially horizontal motion of the hand, the latter naturally keeps such an angled position, be it the right or left hand.

Figure 3:
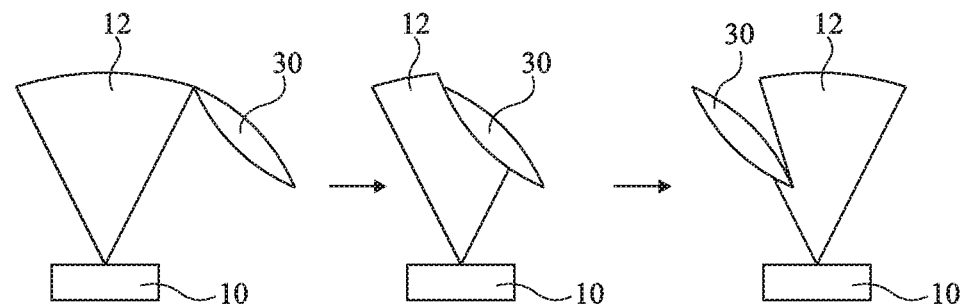
FIGS. 3 to 6 illustrate the operation of an embodiment of a motion detection device for different hand motions.
Figure 4:
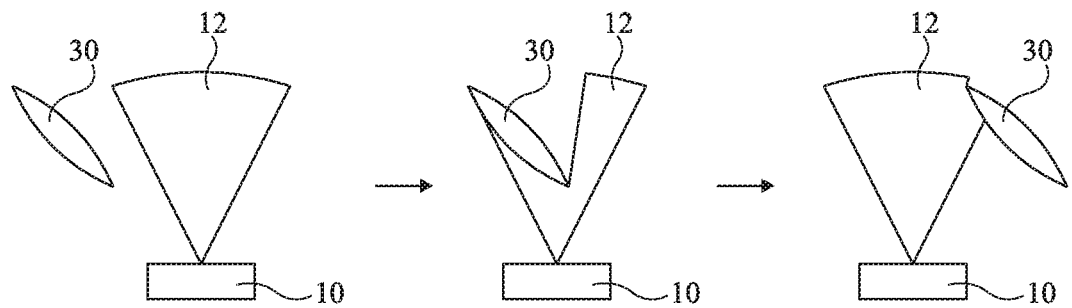
Figure 5:
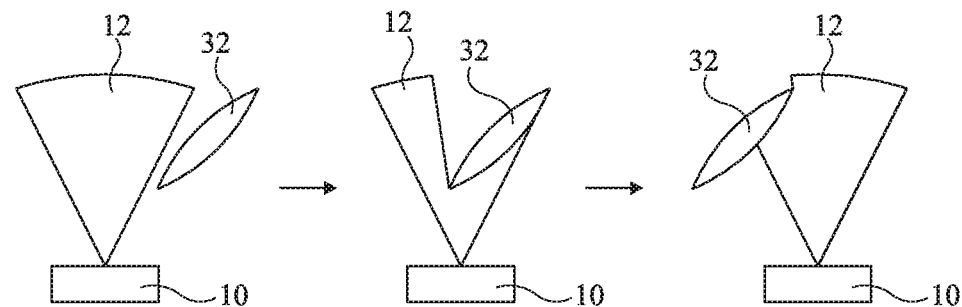
Figure 6:
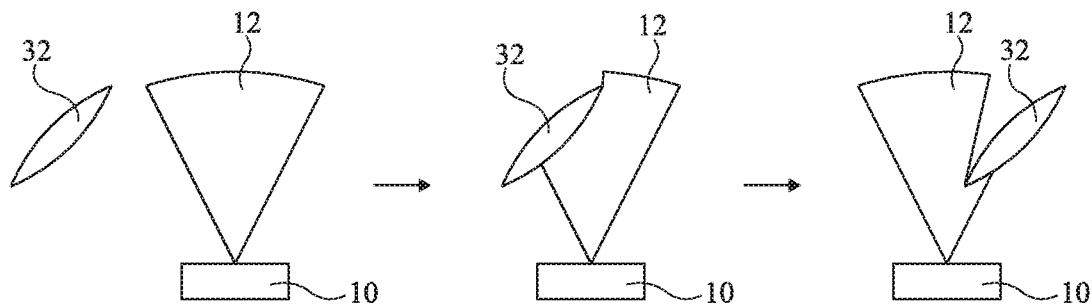

FIGS. 3 to 6 illustrate the operation of an embodiment of a motion detection device for different motions of hands 30 or 32. Each drawing includes three representations of a sensor 10, the three representations being illustrated, from left to right, in a chronological order. More specifically, FIG. 3 illustrates the motion of a right hand 30 moving from right to left above sensor 10 and in detection cone 12. FIG. 4 illustrates the motion of a right hand 30 moving from left to right above sensor 10 and in detection cone 12. FIG. 5 illustrates the motion of a left hand 32 moving from right to left above sensor 10 and in detection cone 12. FIG. 6 illustrates the motion of a left hand 32 moving from left to right above sensor 10 and in detection cone 12.

Right and left are here considered from the user's viewpoint, axis Δ then being the vertical axis.

The motion of hands 30 and 32 is substantially horizontal. It can be effectively observed that the hands have an angled position. Two portions of the hand are defined, a first portion having a projection on central axis Δ most remote from the sensor and a second portion having a projection on the central axis closest to the sensor. Two types of motions can thus generally be distinguished:

a first type of motions where the first portion of the hand enters the detection cone before the second portion. It is the motion illustrated in FIG. 3, that is, the motion from right to left of a right hand, and the motion illustrated in FIG. 6, that is, the motion from left to right of a left hand;

a second type of motions where the second portion of the hand enters the detection cone before the first portion. It is the motion illustrated in FIG. 4, that is, the motion from left to right of a right hand, and the motion illustrated in FIG. 5, that is, the motion from right to left of a left hand.

FIGS. 7A, 7B, 8A, and 8B illustrate, in the form of timing diagrams, an example of data measured by sensor 10.

Figure 7A:
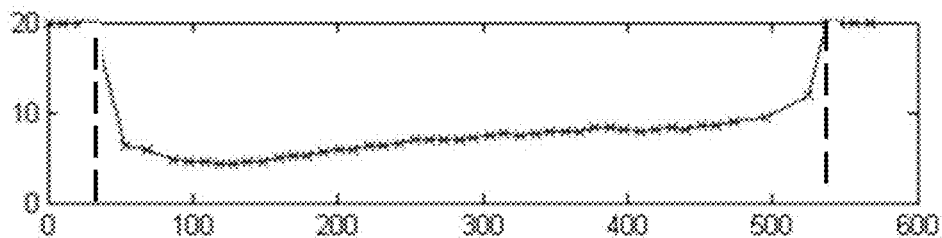
FIGS. 7A, 7B, 8A, and 8B illustrate, in the form of timing diagrams, an example of data measured by a sensor of FIGS. 3 to 6 during its operation.
Figure 7B:
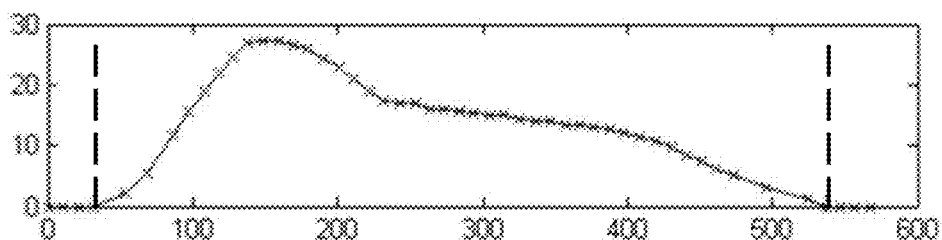

FIGS. 7A and 7B illustrate data obtained by sensor 10 during a motion of a right hand from left to right. The timing diagrams also correspond to a motion of the left hand from right to left. FIGS. 7A and 7B thus correspond to a motion of the second type. FIG. 7A corresponds to the average distance in the detection cone between sensor 10 and the closest object and FIG. 7B corresponds to the intensity of the reflected signal measured by the sensor.

At a time T1, the hand enters the detection cone. This causes a drop in the average distance measured by the sensor. At a time T10, the hand leaves the detection cone. This causes an increase in the average distance measured by the sensor. The duration between time T1 and time T10 corresponds to the detection time period.

The inventors have determined that the average distance measured by the sensor, without taking into account the drop and the increase corresponding to the hand entering or leaving the detection cone, increases when the hand moves in the detection cone. Indeed, the first portion of the hand entering the cone is the portion closest to the sensor.

Further, the inventors have determined, as illustrated in FIG. 7B, that the intensity of the reflected signal is greater at the beginning of the detection time period. More particularly, the maximum intensity of the reflected signal is located in the first half of the detection time period.

Figure 8A:
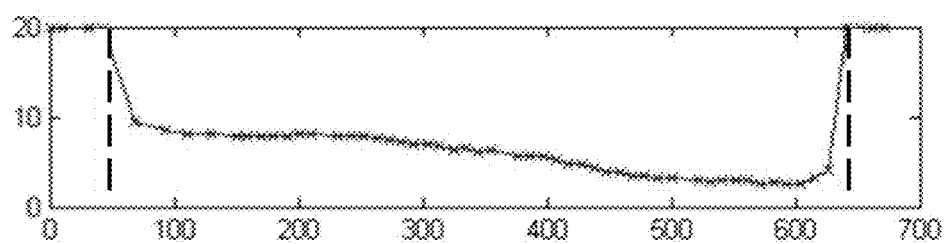
Figure 8B:
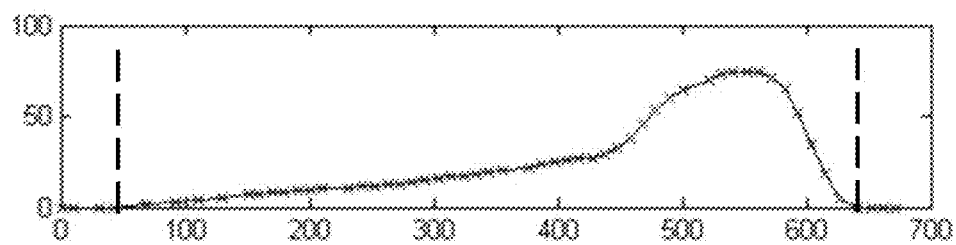

FIGS. 8A and 8B illustrate data obtained by sensor 10 during a motion of the right hand from right to left. The curves also correspond to a motion of the left hand from left to right. FIGS. 8A and 8B thus correspond to a motion of the first type. FIG. 8A corresponds, as in the case of FIG. 7A, to the average distance between sensor 10 and the closest object and FIG. 8B corresponds to the intensity of the reflected signal measured by the sensor.

At a time T2, the hand enters the detection cone. This corresponds to a drop in the average distance measured by the sensor. At a time T20, the hand leaves the detection cone. This corresponds to an increase in the average distance measured by the sensor.

The inventors have determined that, conversely to the case of FIGS. 7A and 7B, the average distance measured by the sensor, without taking into account the drop and the increase corresponding to the hand entering or leaving the detection cone, decreases during the detection time period. Indeed, the first portion of the hand entering the detection cone is the portion most remote from the sensor.

Further, the inventors have determined, as illustrated in FIG. 8B, that the intensity of the reflected signal is greater at the end of the detection time period. More particularly, the maximum intensity of the reflected signal is located in the second half of the detection time period.

It is thus possible to determine the type of motion, first or second, from a single sensor by determining the position of the maximum intensity of the reflected signal in the detection time period. If the maximum is in the second half of the detection time period, the motion is of the first type, and if the maximum is in the first half of the detection time period, the motion is of the second type. Such determinations may be made by a processor of the device 10 that receives and processes the reflected signal for each detection time period.

Further, sensor 10 of the embodiment may also determine other motions, for example, vertical motions such as a so-called "tap" motion, that is, a motion from top to bottom and/or from bottom to top.

An advantage of the described embodiment is that it enables to detect horizontal motions from right to left and from left to right with a single sensor, which is less expensive and takes less space than a larger number of sensors.

Another advantage of this embodiment is that it is independent from the horizontal orientation of the device including the sensor.

An advantage of this embodiment is that the data used are relative data. Indeed, the detection is performed from the variations of the curves rather than from absolute distances. Thus, speed may be preferred to accuracy.

Specific embodiments have been described. Various alterations, modifications, and improvements will readily occur to those skilled in the art.

Such alterations, modifications, and improvements are intended to be part of this disclosure, and are intended to be within the spirit and the scope of the present invention. Accordingly, the foregoing description is by way of example only and is not intended to be limiting.

What is claimed is:

1. A method of recognition a travel direction of a moving object, the method comprising:

generating, over a detection time period, a detection cone by emitting a signal from a single time-of-flight sensor;

detecting, over the detection time period, a reflected component of the signal after being reflected from an object traveling through the detection cone at the time-of-flight sensor;

determining an intensity of the reflected component of the signal over the detection time period;

determining an average distance of the object to the time-of-flight sensor from the reflected component over the detection time period; and based on a correlation over the detection time period between a variation of the intensity and a variation of the average distance of the object, determining the travel direction of the object within the detection cone, the travel direction being determined based on data only from the single time-of-flight sensor.

2. The method of claim 1, wherein determining the travel direction comprises determining the maximum intensity of the reflected component of the signal.

3. The method of claim 2, wherein determining the travel direction comprises determining whether the maximum intensity is in a first half or a second half of the detection time period.

4. The method of claim 1, wherein the detection cone forms a solid angle in a range from approximately 1° to 80°.

5. The method of claim 1, wherein the object is a hand oriented at an angle greater than 5° with the travel direction.

6. The method of claim 1, wherein the object comprises a first portion and a second portion, the first portion having a projection on a central axis of the detection cone most remote from the sensor and the second portion having a projection on the central axis of the detection cone closest to the time-of-flight sensor.

7. The method of claim 6, wherein determining the travel direction comprises determining whether the first portion enters the detection cone before the second portion or the second portion enters the detection cone before the first portion.

8. A method of recognition a travel direction of a moving object, the method comprising:

generating, over a detection time period, a detection cone by emitting a signal from a single sensor, the detection cone comprising a central axis perpendicular to a major surface of the sensor;

in response to an object traveling through the detection cone along a horizontal axis perpendicular to the central axis, detecting at the sensor, over the detection time period, a reflected component of the signal after being reflected from the object;

determining an intensity of the reflected component of the signal over the detection time period;

determining an average distance of the object to the sensor from the reflected component over the detection time period; and based on a correlation over the detection time period between a variation of the intensity and a variation of the average distance of the object, determining the travel direction of the object within the detection cone, the travel direction being determined based on data only from the single sensor and identifying whether the object is a right hand type of object or a left hand type of object.

9. The method of claim 8, wherein determining the travel direction comprises determining the maximum intensity of the reflected component of the signal.

10. The method of claim 29, wherein determining the travel direction comprises determining whether the maximum intensity is in a first half or a second half of the detection time period.

11. The method of claim 8, wherein the detection cone forms a solid angle in a range from approximately 1° to 80°.

12. The method of claim 8, wherein the object is a hand oriented at an angle greater than 5° with the travel direction.

13. The method of claim 8, wherein the object comprises a first portion and a second portion, the first portion having a projection on a central axis of the detection cone most remote from the sensor and the second portion having a projection on the central axis of the detection cone closest to the time-of-flight sensor.

14. The method of claim 13, wherein determining the travel direction comprises determining whether the first portion enters the detection cone before the second portion or the second portion enters the detection cone before the first portion.

15. The method of claim 8, wherein the sensor comprises an ambient radiation sensor.

16. The method of claim 8, wherein the sensor comprises a time-of-flight sensor.

17. A device for determining a travel direction of a moving object, the device comprising:

a time-of-flight sensor configured to:
 generate, over a detection time period, a detection cone by emitting a signal from a single time-of-flight sensor, and
 detect, over the detection time period, a reflected component of the signal after being reflected from an object traveling through the detection cone at the time-of-flight sensor; and a processor programmed to:
 determine an intensity of the reflected component of the signal over the detection time period;
 determine an average distance of the object to the time-of-flight sensor from the reflected component over the detection time period; and
 based on a correlation over the detection time period between a variation of the intensity and a variation of the average distance of the object, determine the travel direction of the object within the detection cone, the travel direction being determined based on data only from the single time-of-flight sensor.

18. The device of claim 17, wherein the processor is programmed to determine the travel direction by being configured to determine the maximum intensity of the reflected component of the signal.

19. The device of claim 18, wherein the processor is programmed to determine the travel direction by being configured to determine whether the maximum intensity is in a first half or a second half of the detection time period.

20. The device of claim 17, wherein the detection cone forms a solid angle in a range from approximately 1° to 80°.

21. The device of claim 17, wherein the object is a hand oriented at an angle greater than 5° with the travel direction.

22. The device of claim 17, wherein the object comprises a first portion and a second portion, the first portion having a projection on a central axis of the detection cone most remote from the sensor and the second portion having a projection on the central axis of the detection cone closest to the time-of-flight sensor.

23. The device of claim 22, wherein the processor is programmed to determine the travel direction by being configured to determine whether the first portion enters the detection cone before the second portion or the second portion enters the detection cone before the first portion.

* * * * *

UNITED STATES PATENT AND TRADEMARK OFFICE
CERTIFICATE OF CORRECTION

| | |
|---|---|
| PATENT NO. | : 11,500,097 B2 |
| APPLICATION NO. | : 16/374541 |
| DATED | : November 15, 2022 |
| INVENTOR(S) | : Giovanni Scozzola |

It is certified that error appears in the above-identified patent and that said Letters Patent is hereby corrected as shown below:

In the Claims

Claim 10, Column 6, Line 1; delete "claim 29" and insert --claim 9--.

Signed and Sealed this
Twentieth Day of December, 2022

*Katherine Kelly Vidal*

Katherine Kelly Vidal
*Director of the United States Patent and Trademark Office*